(12) United States Patent
Mamut et al.

(10) Patent No.: US 11,823,240 B2
(45) Date of Patent: Nov. 21, 2023

(54) EFFICIENT UPDATES OF BIOMETRIC DATA FOR REMOTELY CONNECTED DEVICES

(71) Applicant: MASTERCARD INTERNATIONAL INCORPORATED, Purchase, NY (US)

(72) Inventors: Vladimir Mamut, Jewett, NY (US); Alex Zerio, New York, NY (US)

(73) Assignee: Mastercard International Incorporated, Purchase, NY (US)

( * ) Notice: Subject to any disclaimer, the term of this patent is extended or adjusted under 35 U.S.C. 154(b) by 113 days.

(21) Appl. No.: 17/501,072

(22) Filed: Oct. 14, 2021

(65) Prior Publication Data

US 2022/0114630 A1 Apr. 14, 2022

Related U.S. Application Data

(60) Provisional application No. 63/091,430, filed on Oct. 14, 2020.

(51) Int. Cl.
*G06Q 30/00* (2023.01)
*G06Q 30/0601* (2023.01)
*H04L 41/0803* (2022.01)

(52) U.S. Cl.
CPC ..... *G06Q 30/0601* (2013.01); *H04L 41/0803* (2013.01)

(58) Field of Classification Search
CPC .............................................. G06Q 30/06–08
See application file for complete search history.

(56) References Cited

U.S. PATENT DOCUMENTS 10,725,767 B2 * 7/2020 Jose ...................... H04L 9/3239
10,795,664 B2 * 10/2020 Mercille ................ G06F 8/658
(Continued)

FOREIGN PATENT DOCUMENTS

WO 2014098299 A1 6/2014

OTHER PUBLICATIONS

Pandit, A., "Limiting Insider Attacks on Routers in an Autonomous System Running a Link State Routing Protocol" (Thesis presented to Univ. Missouri-Kansas City) (Kansas City, Missouri 2002) (Proquest document 1408392) (Year: 2002).*
(Continued)

*Primary Examiner* — Ethan D Civan
(74) *Attorney, Agent, or Firm* — Michael Best & Friedrich LLP

(57) ABSTRACT

A system for providing biometric data to a user device. The system includes an electronic processor, the electronic processor configured to receive, from a remote device, biometric data for a user and create a biometric token for the user based on the biometric data. The electronic processor is also configured to transmit the biometric token to a global token repository, periodically create, for a user device, an update package including a subset of updated biometric tokens from the global token repository that are associated with one or more programs associated with the user device, by identifying one or more updated biometric tokens in the global token repository associated with a program GUID of a program of the one or more programs, and transmit the update package to the user device when the user device is next in communicative contact with the electronic computing device.

20 Claims, 4 Drawing Sheets

(56) References Cited

U.S. PATENT DOCUMENTS

| | | |
|---|---|---|
| 2004/0054889 A1 | 3/2004 | Pitsos |
| 2011/0191840 A1 | 8/2011 | Ortiz et al. |
| 2014/0230018 A1 | 8/2014 | Anantharaman |
| 2016/0253170 A1* | 9/2016 | Fardig ............... G06F 8/658 717/170 |
| 2018/0268414 A1* | 9/2018 | Chung ............. G06Q 20/409 |
| 2020/0042684 A1* | 2/2020 | Gehrmann ......... H04L 63/0807 |

OTHER PUBLICATIONS

International Search Report and Written Opinion for Application No. PCT/US2021/054710 dated Feb. 9, 2022 (10 pages).

* cited by examiner

EFFICIENT UPDATES OF BIOMETRIC DATA FOR REMOTELY CONNECTED DEVICES

CROSS-REFERENCE TO RELATED APPLICATION

This application claims priority to and the benefit of U.S. Provisional Patent Application No. 63/091,430, filed on Oct. 14, 2020, the entire contents of which is incorporated herein by reference.

BACKGROUND

Many services are provided to people in remote locations of the world, such as areas without strong internet infrastructure. For example, different humanitarian organizations may establish programs that provide services such as healthcare services, food aid, and financial services (for example, providing vouchers for taking public transit to get immunizations at a clinic) to people in these remote locations. Software applications installed on computing devices are used to aid in implementing programs to provide these services. For example, software applications may be used for scheduling immunizations, managing healthcare data and food vouchers, a combination of the foregoing, or the like. A software application implementing a program may require users to register with the program in order to access the services provided by the program. Registering a user with a program may include gathering biometric data of the user.

However, keeping user data updated across a plurality of computing devices being used to provide a plurality of services to users is difficult due to lack of internet infrastructure and the need for these computing devices to be durable and cost-efficient. Due to the lack of internet infrastructure, these computing devices connect to the internet infrequently. Because of the large amounts of data that must be transferred to each computing device (e.g., biometric data for hundreds, thousands, or millions of users of different services available on the device), the limited bandwidth and processing power available present significant challenges to keeping user data up to date across computing devices. This is the case even though, in an effort to utilize less bandwidth, biometric data is often hashed to form biometric tokens.

SUMMARY

Therefore, embodiments herein describe, among other things, a system and method for providing biometric data to a user device. The systems and methods described herein provide a solution for providing individualized update packages for devices in remote areas of the world, such as rural areas with minimal internet infrastructure. Due to the nature of the computing devices (for example, needing to be durable and cost-efficient and, therefore, having minimal processing power and memory, etc.), and the nature of the environment in which they operate (for example, a lack of network access and bandwidth), implementing a system in which millions of biometric tokens constantly need to be downloaded by these devices is unreasonable. Instead of downloading an entire database of biometric tokens to each device, it is instead desirable to download only a subset of biometric tokens that each individual device will need to properly manage the various charitable programs the device serves. This subset of tokens includes any updates (for example, newly-added tokens or changes in existing tokens) that affect programs associated with the device. For example, if the device is associated with a health initiative in a particular country, tokens that are associated with that health initiative and have been changed or added to the database since the last update of the device may be included in the subset.

By selecting this subset for each device, the time that the device is connected to the internet can be used to download only the biometric tokens the device needs. Selecting the subset of biometric tokens to download to the device prevents bandwidth, memory, and download time from being wasted on downloading biometric tokens that not been updated or will never be used by that particular device to provide one or more services. Thus, systems and methods described herein reduce the amount of internet bandwidth, processing power, and memory needed to download relevant biometric data to devices deployed in remote locations by optimizing downloadable packages for each device.

One embodiment describes a system for providing biometric data to a user device. The system includes an electronic computing device including an electronic processor, the electronic processor configured to receive, from a remote device, biometric data for a user and create a biometric token for the user based on the biometric data. The electronic processor is further configured to transmit the biometric token to a global token repository, periodically create, for a user device, an update package including a subset of updated biometric tokens from the global token repository that are associated with one or more programs associated with the user device, by identifying one or more updated biometric tokens in the global token repository associated with a program GUID of a program of the one or more programs, and transmit the update package to the user device when the user device is next in communicative contact with the electronic computing device.

Another embodiment describes a method providing biometric data to a user device. The method includes receiving, at an electronic computing device, biometric data for a user from a remote device and creating, with the electronic computing device, a biometric token for the user based on the biometric data. The method further includes transmitting, with the electronic computing device, the biometric token to a global token repository, periodically creating, for a user device, an update package including a subset of updated biometric tokens from the global token repository that are associated with one or more programs associated with the user device, by identifying one or more updated biometric tokens in the global token repository associated with a program GUID of a program of the one or more programs, and transmitting, with the electronic computing device, the update package to the user device when the user device is next in communicative contact with the electronic computing device.

Yet another embodiment describes a non-transitory computer-readable medium with computer-executable instructions stored thereon, executed by an electronic processor, to perform the method of providing biometric data to a user device, the method including receiving biometric data for a user from a remote device and creating a biometric token for the user based on the biometric data. The method also includes transmitting the biometric token to a global token repository, periodically creating, for a user device, an update package including a subset of updated biometric tokens from the global token repository that are associated with one or more programs associated with the user device, by identifying one or more updated biometric tokens in the global token repository associated with a program GUID of a program of the one or more programs, and transmitting the update package to the user device when the user device is next in communicative contact with the electronic computing device.

DETAILED DESCRIPTION OF THE EMBODIMENTS

Figure 1:
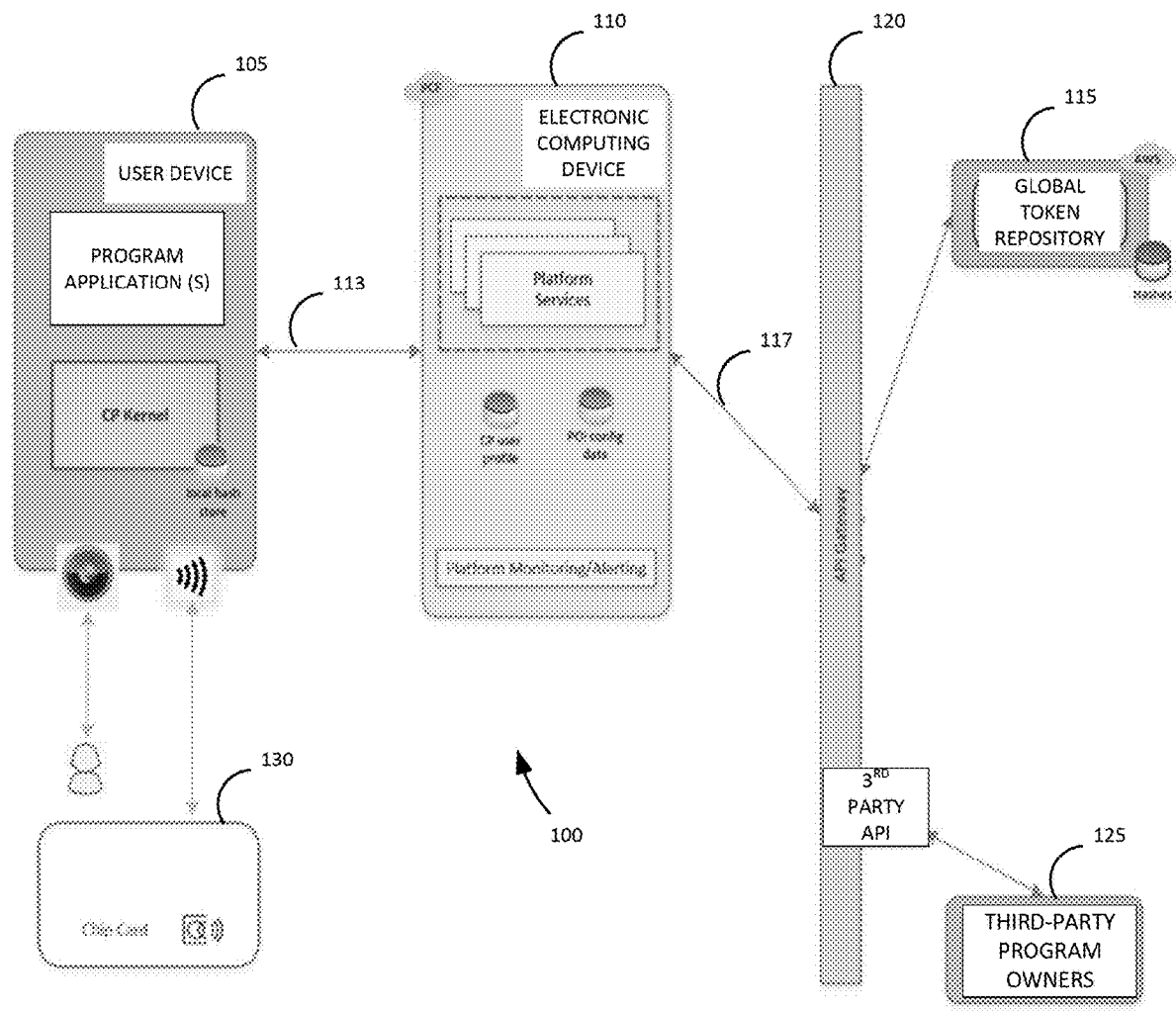
FIG. 1 illustrates a system for providing biometric data to a user device according to one embodiment.

FIG. 1 is a block diagram of a system 100 for providing biometric data to a user device according to one embodiment. In the example shown, the system 100 includes a user device 105 and an electronic computing device 110. The electronic computing device 110 and user device 105 are communicatively coupled via a communication network 113. The communication network 113 is an electronic communications network including wireless and wired connections. The communication network 113 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and that the user device 105 included in FIG. 1 is purely for illustrative purposes. It should also be understood that the system 100 may include a different number of electronic computing devices than the number of electronic computing devices illustrated in FIG. 1 and the functionality described herein as being performed by the electronic computing device 110 may be performed by a plurality of electronic computing devices. It should be understood that some of the functionality described herein as being performed by the electronic computing device 110 may be performed by a user device. It should also be understood that some of the functionality described herein as being performed by a user device may be performed by the electronic computing device 110.

In the embodiment illustrated in FIG. 1, the electronic computing device 110 is, for example, a server that is configured to provide biometric data to the user device 105. In the embodiment illustrated in FIG. 1, the user device 105 is an electronic computing device (for example, a smart telephone, a laptop computer, a desktop computer, a smart wearable, a smart appliance, a smart home assistant, or other type of electronic computing device configured to operate as described herein).

The system 100 also includes a global token repository 115. The global token repository 115 is a database accessible by the electronic computing device 110 through an application programming interface ("API") gateway 120 via a second communication network 117. The API gateway 120 may be a server or server-side logic implemented on the electronic computing device 110 that allows the electronic computing device 110 to communicate with the global token repository 115 and third-party program owners 125 (for example, the World Health Organization). The third-party program owners 125 may communicate, to the electronic computing device 110, information regarding user registration information for one or more programs. For example, the World Health Organization may send a communication to the electronic computing device 110 indicating that all users or beneficiaries registered with an Ebola immunization program, should also be registered with a Covid immunization program.

The global token repository 115 stores biometric data for a plurality of users as biometric tokens, or unique identifiers generated by a hashing function using biometric data gathered from each user of the plurality of users. In some embodiments, a biometric token associated with a user includes one or more biometric hashes associated with the user and each biometric hash included in the biometric token is associated with a different biometric feature of the user. For example, a first biometric hash included in the biometric token may be associated with the user's fingerprints (a first biometric feature), a second biometric hash included in the biometric token may be associated with the user's face (a second biometric feature), and a second biometric hash included in the biometric token may be associated with the user's voice (a third biometric feature). The global token repository 115 may also store user identification information associated with the users and their biometric tokens. The user identification information associated with biometric tokens may include such items as name, address, and other information for identifying the users associated with each biometric token. The global token repository 115 may include additional fields for each unique biometric token. For example, when a user's biometric data is gathered and hashed, the program the user registers with (e.g., a program run by the World Health Organization) may be stored as a program identification number, which may be a Globally Unique Identifier (hereinafter referred to as a "Program GUID") associated with the biometric token. A biometric token can be associated with multiple programs. For example, when a program owner creates a new program, the program owner may communicate with the electronic computing device 110 to specify which users' biometric tokens in the global token repository 115 should be associated with the new program's Program GUID. In some embodiments, the electronic computing device 110 associated biometric tokens of the users specified by the program owner with the new program's Program GUID.

The global token repository 115 may be queried by the electronic computing device 110 to retrieve subsets of biometric tokens based upon various search parameters. For example, the electronic computing device 110 may query the global token repository 115 for all biometric tokens related to a particular program or Program GUID and receive a list of results back from the global token repository 115. These returned results may be included in an update package created by the electronic computing device 110, as described later in this application.

In some embodiments, the system 100 also includes a chip card 130. The chip card 130 includes a computer chip that is configured to communicate with the user device 105 and store data associated with a user (for example, a biometric token associated with the user, a name of the user, an address of the user, a combination of the foregoing, or the like). The user may carry the chip card 130 and, in the event that the user attempts to access a service provided by a program from a device that does not have up-to-date information or data associated with the user due to a lack of access to the communication network 113, the user may use the chip card 130 to access the service.

Figure 2:
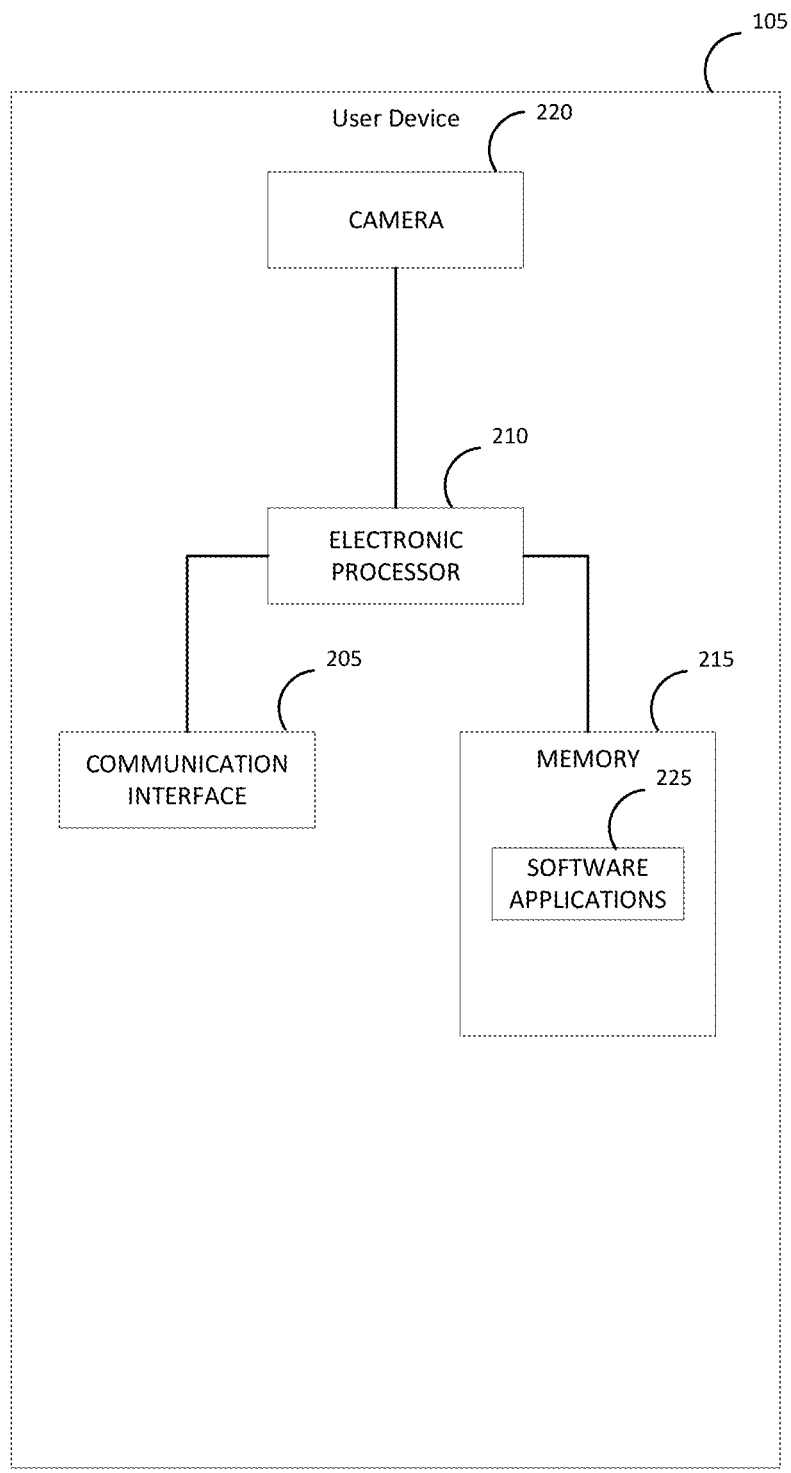
FIG. 2 illustrates a user device according to one embodiment.

FIG. 2 is a block diagram of an example of the user device 105. The user device 105 includes a communication interface 205, an electronic processor 210, a memory 215, and a camera 220. The user device 105 may be a smartphone, a tablet, a smart wearable, a laptop computer, a desktop computer, a personal digital assistant, or any other manner of personal user device.

The communication interface 205 allows the user device 105 to communicate with external devices through wireless or wired means of communication (for example, the communication network 113) and may include circuitry such as a transceiver, antenna, and other communication circuits.

The electronic processor 210 is a processing circuit, such as an application-specific integrated circuit ("ASIC"), microprocessor, or other suitable circuit, and is configured to execute instructions accessed from the memory 215 and, among other things, perform functions related to the operation of the user device 105. In some embodiments, the functionality of the electronic processor 210 is performed by a plurality of processors. The electronic processor 210 is electronically connected to the communication interface 205, the memory 215, and the camera 220. In some embodiments, the functionality described herein as being performed by the user device 105 may be performed by the electronic processor 210.

The memory 215 is a non-transitory, computer-readable medium that stores data and instructions that, when executed by the electronic processor 210, perform functions related to the operation of the user device 105. The memory 215 also stores one or more software applications 225 related to programs or services that the user device 105 is associated with.

In some embodiments, before the user device 105 is sent to a remote location where it will be used (for example, a medical outreach clinic run by the World Health Organization), the user device 105 is associated with one or more programs. In this sense, programs refer to the various initiatives, such as the medical outreach program, being offered to those in need. The user device 105 is associated with these programs by registering an association between a device identifier of the user device 105 and the Program GUID in an area of memory in the electronic computing device 110 associated with an update package creation program 325 (discussed below in relation to FIG. 3).

As discussed above, programs are owned by an owner (such as a third-party) and provide services, such as vouchers to get immunizations, to beneficiaries. The services may be provided by a program through the use of one or more associated software applications (for example, the software applications 225). In order to access the services provided by a program, beneficiaries must register for the program. Registering for a program includes providing biometric data associated with a user to the program so that the identity of the registered user may be verified in the future. In some embodiments, when a user or beneficiary attempts to register, via the user device 105, with a program to receive a desired service, the user device 105 may ask the beneficiary to confirm that they have not already registered for any other programs managed by the electronic computing device 110. When the user or beneficiary indicates that they have not previously registered for any programs, the user device 105 prompts the user to provide their biometric data.

In some embodiments, the camera 220 is used to capture biometric data of the beneficiaries and biometric data is, therefore, gathered completely contactless. Facial images, palm images, and fingerprint images may be gathered by the camera 220 and then transmitted by the user device 105 to the electronic computing device 110. In some embodiments, in addition to or instead of the camera 220, the user device 105 may include one or more devices (for example, a fingerprint sensor, a microphone, or the like) for collecting biometric data from a user.

Figure 3:
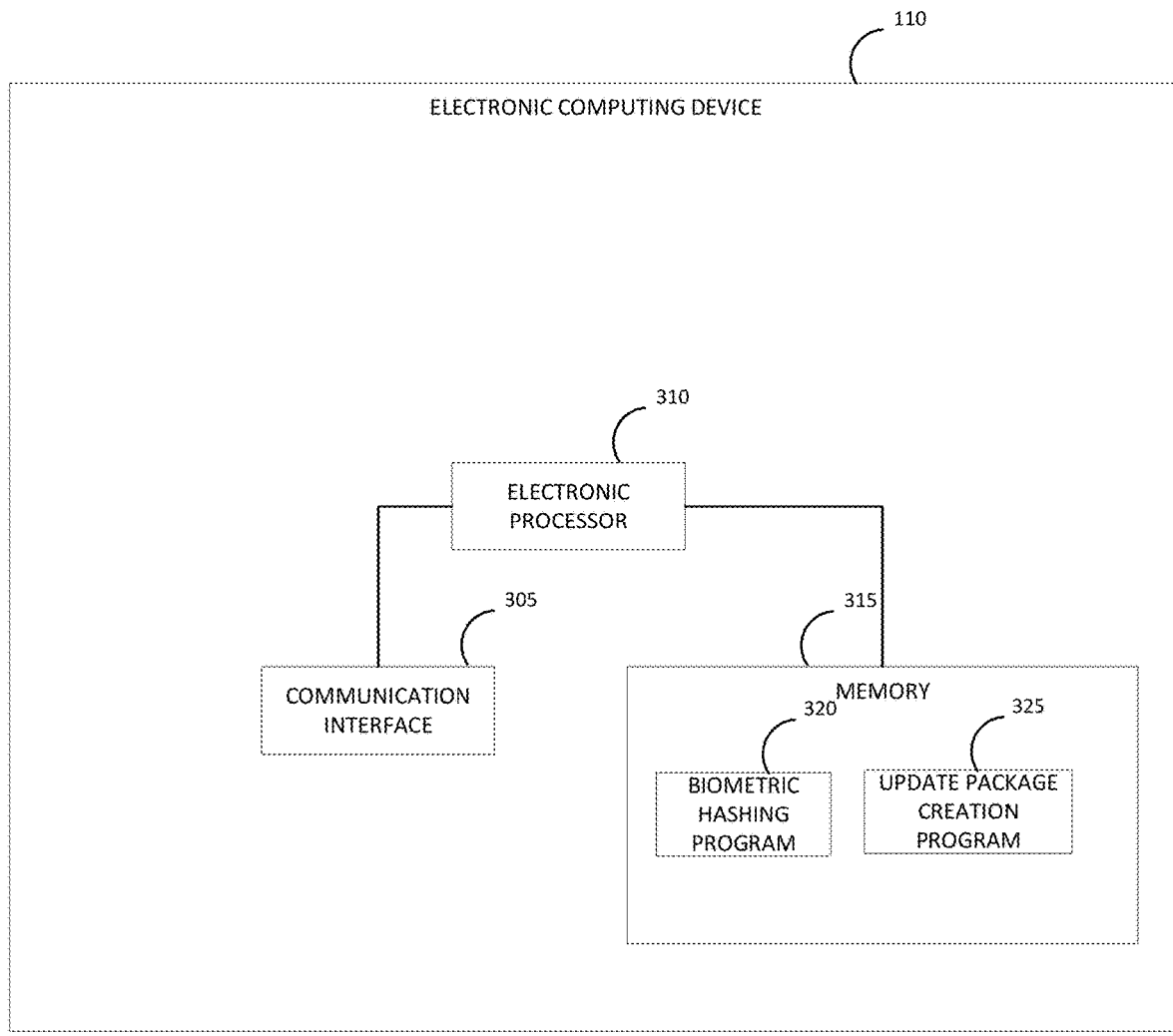
FIG. 3 illustrates an electronic computing device according to one embodiment.

FIG. 3 illustrates the electronic computing device 110 according to one embodiment. The electronic computing device 110 may be, in one example, a server or server cluster. Much like the user device 105, the electronic computing device 110 includes a communication interface 305, an electronic processor 310, and a memory 315, which are similar to the communication interface 205, electronic processor 210, and memory 215 as described with regards to FIG. 2. In some embodiment, the functionality described herein as being performed by the electronic computing device 110 is performed by the electronic processor.

The memory 315 of the electronic computing device 110 stores data and instructions that, when executed by the electronic processor 310, cause the electronic processor 310 to perform functions related to the operation of the electronic computing device 110. The memory 315 also stores a biometric hashing program 320 and an update package creation program 325.

In some embodiments, when executing the biometric hashing program 320, the electronic processor 310 receives the biometric data (for example, biometric features of a user such as facial images, fingerprint images, palm images, or the like) captured by the user device 105. When executing the biometric hashing program 320, the electronic processor 310 converts the biometric data into one or more unique biometric hashes. Each of the biometric hashes are added to a biometric token created for the user. A biometric hash may be created using any number of hashing functions, which convert data into an encrypted, unique identifier (a "hash"). One or more Program GUID(s) are associated with the biometric token based on what programs the user is registered for and both the token and the associated Program GUID(s) are transmitted to the global token repository 115. In some embodiments, user information, such as name and address, is also associated with the biometric token created for the user and transmitted to the global token repository 115.

In some embodiments, before sending the biometric token and its associated information to the global token repository 115 for storage, the electronic computing device 110 uses the biometric token and the user information associated with the biometric token to confirm that the user associated with the biometric token had not already registered with a program managed by the electronic computing device 110. If the user has already registered with a program managed by the electronic computing device 110, the biometric token and its associated information is not added to the global token repository 115.

In some embodiments, when executing the update package creation program 325, the electronic processor 310 creates a unique update package for an individual device, such as the user device 105. The electronic processor 310 stores associations between device identifiers and one or more Program GUIDs in, for example, an area of the memory 315 associated with the update package creation program 325. These associations allow the electronic processor 310 to identify which devices are associated with which programs. In addition to including biometric token data, the update packages may also include instructions or configuration files for program specific setup, additional data for the program, additional data or information for unique hashes of the biometric token data, user information, a combination of the foregoing, or the like.

Because the global token repository 115 could contain millions of unique biometric tokens, the user device 105 cannot handle its own copy of the global token repository 115 due to its limitations (e.g., low processing power, infrequent access to the internet, low memory). The limitations of the user device 105 are dictated by the environment the user device 105 will operate in, (for example, rural areas with limited internet infrastructure and harsh areas of the world that require the user device 105 to be durable and inexpensive).

Thus, the electronic processor 310, when executing the update package creation program 325, identifies a user device, such as the user device 105, by the device identifier associated with the user device 105 and then determines which programs the user device 105 is associated with using Program GUIDs associated with the device identifier.

Then, the electronic processor 310 queries the global token repository 115 for all updated biometric tokens associated with the Program GUID(s) that the user device 105 is associated with. In some embodiments, in addition to including the Program GUID, the query sent by the electronic processor 310 further includes parameters such as program location (country, region, sub-region), segment of the program (health, financial, agriculture, etc.), program owner, program age or duration, a combination of the foregoing, or the like. By only querying the global token repository 115 for changes (e.g., added new tokens, updated existing tokens, deleted old or unusable tokens) associated with the Program GUID(s) the user device 105 is associated with, processing power of the electronic computing device 110 is saved and a smaller, individualized update package is created for the user device 105. The smaller update package requires less memory to store both on the electronic computing device 110 and the user device 105, causing the user device 105 to require less memory and, thus, be inexpensive. The query returns all changes associated with the Program GUID(s) and any additional user information, such as name and address, that has been stored with the biometric tokens. In some embodiments, the query may return a token status, such as added/deleted/modified, a relationship between the token and one or more programs, or the like.

In some embodiments, the electronic processor 310 creates update packages periodically (for example, hourly, daily, or based on a predetermined schedule). Because devices such as the user device 105 only infrequently connect to the internet for short periods of time, creating an update package for the user device 105 in response to the connection may take longer than the time the user device 105 is actually connected to the internet. Thus, to save processing resources, bandwidth, and data transmission time, the update packages are created periodically and, when the user device 105 next connects to the internet, the update package for the user device 105 device is sent by the electronic processor 310 from, for example, a location in the memory 315 associated with the update package creation program 325 where the update package was stored). In some embodiments, when the user device 105 receives the update package, the user device 105 updates, based on the received update package, the biometric tokens and the user information associated with the biometric tokens stored in the memory 215 of the user device 105.

Figure 4:
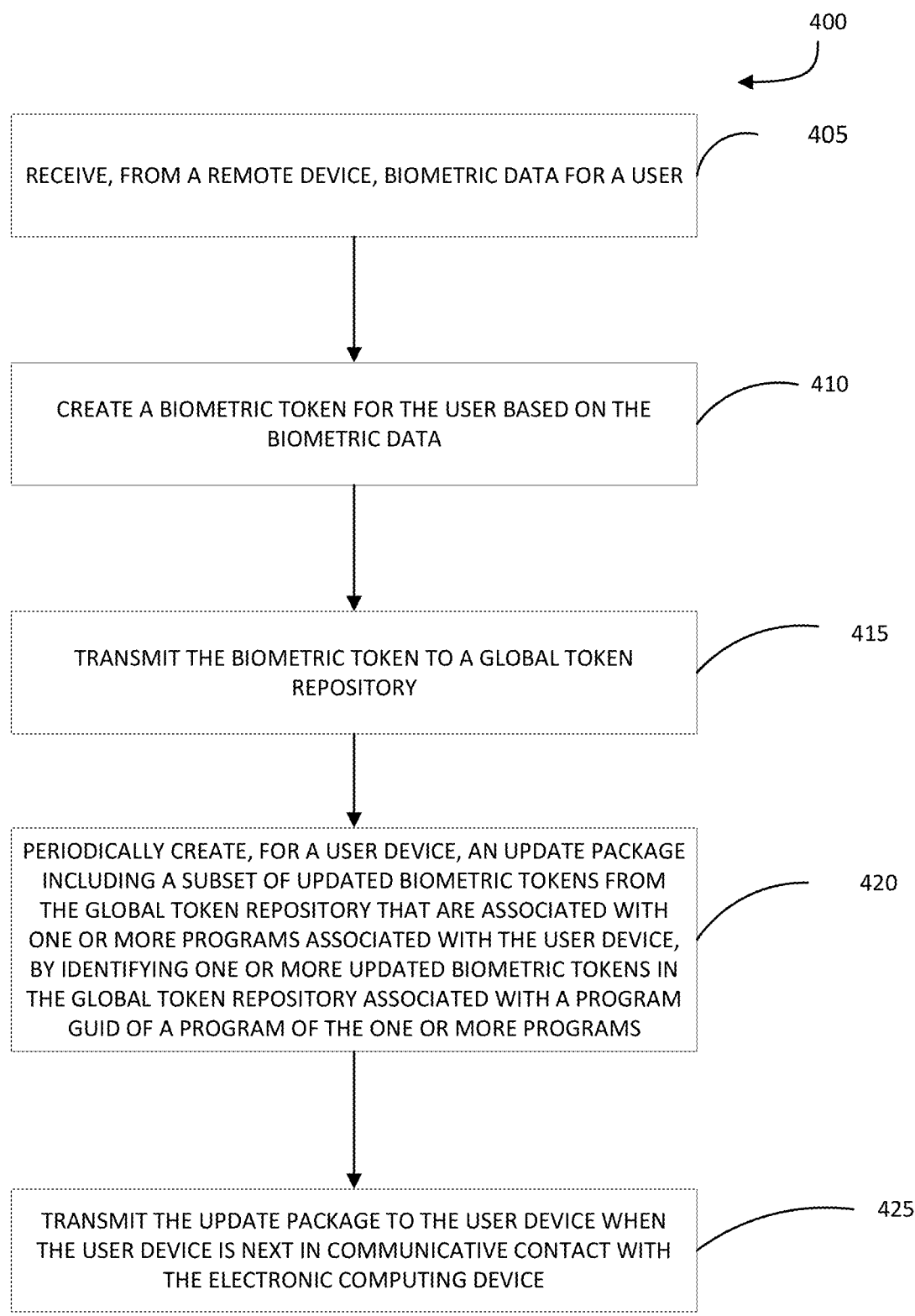
FIG. 4 illustrates a method for providing biometric data to a user device according to one embodiment.

FIG. 4 illustrates a method 400 of providing biometric data, such as the update package including the changes to biometric tokens, to the user device 105. The method 400 includes receiving, at the electronic computing device 110, biometric data for a user from a remote device, such as the user device 105 (block 405). As described above, the user device 105 captures biometric data of a user using, for example, the camera 220 and then transmits the biometric data to the electronic computing device 110. The method 400 also includes creating, with the electronic computing device 110, a biometric token for the user based on the biometric data (block 410). The biometric token includes one or more biometric hashes. Each biometric hash included in the biometric token is unique to the user and is created by the electronic processor 310 using the biometric hashing program 320.

The method 400 further includes transmitting, with the electronic computing device 110, the biometric token to the global token repository 115 (block 415). As described above, in addition to sending the biometric token to the global token repository 115, the electronic computing device 110 may also send a Program GUID associated with the biometric token and may also send user identity information, such as name and address, to be stored with the biometric token in the global token repository 115.

The method 400 also includes periodically creating, for the user device 105, an update package including a subset of updated biometric tokens from the global token repository 115 that are associated with one or more programs associated with the user device 105, by identifying one or more updated biometric tokens in the global token repository 115 associated with a program GUID of a program of the one or more programs (block 420). As described above, the electronic computing device 110 queries the global token repository 115 to identify a subset of updated tokens associated with a particular Program GUID(s) that is associated with the user device 105 that the update package is being created for. The returned data from the query, or the update package, includes a subset of biometric tokens from the global token repository 115 that have been updated. For example, an updated biometric token may be at least one selected from the group comprising: a new biometric token associated with the program GUID, a changed biometric token associated with the program GUID, a deleted biometric token associated with the program GUID), or the like.

The method 400 further includes transmitting, with the electronic computing device 110, the update package to the user device 105 when the user device 105 is next in communicative contact with the electronic computing device 110 (block 425). As described above, the user device 105 is not always in communicative contact with the electronic computing device 110. So, when the user device 105 is next brought into communicative contact with the electronic computing device 110 (e.g., when the user device 105 next connects to the internet), the electronic computing device 110 receives contact from the user device 105 and then transmits the update package with the subset of tokens and changes to tokens to the user device 105.

In some embodiments, the update package includes a plurality of packets. Each of the packets includes one or more biometric tokens and, in some embodiments, user information. In some embodiments, the electronic computing device 110 transmits the update package to the user device 105 one packet at a time. When the electronic computing device 110 receives an acknowledgement or confirmation from the user device 105 confirming that the user device 105 has received the packet, the electronic computing device 110 removes the packet from the update package.

If the user device 105 loses communicative contact with the electronic computing device 110 before the entire update package is received by the user device 105, the packets remaining in the update package when communicative contact with the user device 105 is lost will be included in the next update package that the electronic computing device 110 creates for the user device 105.

The user device 105 includes one or more software applications that receive the update package, extract the biometric token data and any additional data associated with the biometric token data from the update package, and then process the biometric data. Once the data is processed, other software applications (for example, the software applications 225) on the user device 105 may then use the biometric token data to perform functions related to each program associated with the user device 105. For example, once the biometric token data is extracted and processed, an electronic medical record software application may use the now-updated biometric token data to help clinics maintain individual health records for authenticated individuals.

It should be understood that one or more embodiments are described and illustrated herein in the description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for providing biometric data to a user device, the system comprising: an electronic computing device including an electronic processor, the electronic processor configured to:
   receive, from a remote device, biometric data for a user;
   create a biometric token for the user based on the biometric data;
   transmit the biometric token to a global token repository;
   periodically create, for a user device, an update package including a subset of updated biometric tokens from the global token repository that are associated with the user device, by identifying, with one or more search parameters, one or more updated biometric tokens in the global token repository associated with a program Globally Unique Identifier ("GUID") of a program of the one or more programs, wherein the one or more search parameters includes the program GUID; and
   transmit the update package to the user device when the user device is next in communicative contact with the electronic computing device.

2. The system of claim 1, wherein the update package includes a plurality of packets and the electronic processor is configured to transmit the update package to the user device when the user device is next in communicative contact with the electronic computing device by
   for each packet of the plurality of packets:
      transmitting, to the user device, the packet in the plurality of packets
      receiving, from the user device, confirmation that the user device received the packet; and
      in response to receiving the confirmation, removing the packet from the update package.

3. The system of claim 2, wherein the electronic processor is configured to, when the user device loses communicative contact with the electronic computing device before each packet of the plurality of packets is received by the user device, include packets remaining in the update package when communicative contact with the user device is lost in a next update package created for the user device.

4. The system of claim 1, wherein the update package further includes user information associated with a biometric token included in subset of updated biometric tokens.

5. The system of claim 1, wherein the biometric token includes one or more biometric hashes and each of the one or more biometric hashes is associated with a biometric feature of the user.

6. The system of claim 1, wherein the one or more programs each include one or more services to be offered to users.

7. The system of claim 1, wherein each biometric token included in the subset of updated biometric tokens is at least one selected from the group comprising: a new biometric token associated with the program GUID, a changed biometric token associated with the program GUID, and a deleted biometric token associated with the program GUID, and wherein the one or more search parameters is at least one selected from the group consisting of: program location, segment of the program, program owner, and program age or duration.

8. A method providing biometric data to a user device, the method comprising:

receiving, at an electronic computing device, biometric data for a user from a remote device;

creating, with the electronic computing device, a biometric token for the user based on the biometric data;

transmitting, with the electronic computing device, the biometric token to a global token repository;

periodically creating, for a user device, an update package including a subset of updated biometric tokens from the global token repository that are associated with one or more programs associated with the user device, by identifying, with one or more search parameters, one or more updated biometric tokens in the global token repository associated with a program Globally Unique Identifier ("GUID") of a program of the one or more programs, wherein the one or more search parameters includes the program GUID; and transmitting, with the electronic computing device, the update package to the user device when the user device is next in communicative contact with the electronic computing device.

9. The method of claim 8, wherein the update package is created by querying the global token repository for updated biometric tokens associated with the one or more programs.

10. The method of claim 8, wherein the biometric token includes one or more biometric hashes and each of the one or more biometric hashes is associated with a biometric feature of the user.

11. The method of claim 8, wherein the update package further includes user information associated with a biometric token included in subset of updated biometric tokens.

12. The method of claim 8, wherein the user device is associated with the one or more programs before being deployed to a remote location.

13. The method of claim 8, wherein the one or more programs each include one or more services to be offered to users.

14. The method of claim 8, wherein each biometric token included in the subset of updated biometric tokens is at least one selected from the group comprising: a new biometric token associated with the program GUID, a changed biometric token associated with the program GUID, and a deleted biometric token associated with the program GUID, and wherein the one or more search parameters is at least one selected from the group consisting of: program location, segment of the program, program owner, and program age or duration.

15. A non-transitory computer-readable medium with computer-executable instructions stored thereon executed by an electronic processor to perform the method of providing biometric data to a user device, comprising:

receiving biometric data for a user from a remote device;

creating a biometric token for the user based on the biometric data;

transmitting the biometric token to a global token repository;

periodically creating, for a user device, an update package including a subset of updated biometric tokens from the global token repository that are associated with one or more programs associated with the user device, by identifying, with one or more search parameters, one or more updated biometric tokens in the global token repository associated with a program Globally Unique Identifier ("GUID") of a program of the one or more programs, wherein the one or more search parameters includes the program GUID; and transmitting the update package to the user device when the user device is next in communicative contact with the electronic processor.

16. The non-transitory computer-readable medium of claim 15, wherein the update package is created by querying the global token repository for updated biometric tokens associated with the one or more programs.

17. The non-transitory computer-readable medium of claim 15, wherein the biometric token includes one or more biometric hashes and each of the one or more biometric hashes is associated with a biometric feature of the user.

18. The non-transitory computer-readable medium of claim 15, wherein the update package further includes user information associated with a biometric token included in subset of updated biometric tokens.

19. The non-transitory computer-readable medium of claim 15, wherein each biometric token included in the subset of updated biometric tokens is at least one selected from the group comprising: a new biometric token associated with the program GUID, a changed biometric token associated with the program GUID, and a deleted biometric token associated with the program GUID, and wherein the one or more search parameters is at least one selected from the group consisting of: program location, segment of the program, program owner, and program age or duration.

20. The non-transitory computer-readable medium of claim 15, wherein the one or more programs each include one or more services to be offered to users.

* * * * *